(12) United States Patent
Cao et al.

(10) Patent No.: US 11,893,143 B2
(45) Date of Patent: Feb. 6, 2024

(54) STORAGE DEVICE FOR DATA ENCRYPTION AND SELF-DESTRUCTION

(71) Applicant: Hainan University, Haikou (CN)

(72) Inventors: Chunjie Cao, Haikou (CN); Xin Zheng, Haikou (CN); Yang Sun, Haikou (CN); Fangjian Tao, Haikou (CN)

(73) Assignee: Hainan University, Haikou (CN)

( * ) Notice: Subject to any disclaimer, the term of this patent is extended or adjusted under 35 U.S.C. 154(b) by 289 days.

(21) Appl. No.: 17/449,262

(22) Filed: Sep. 29, 2021

(65) Prior Publication Data

US 2022/0100910 A1    Mar. 31, 2022

(30) Foreign Application Priority Data

Sep. 30, 2020    (CN) .......................... 202011064302.7

(51) Int. Cl.

| G06F 3/00 | (2006.01) |
| G06F 21/78 | (2013.01) |
| G06F 3/06 | (2006.01) |
| G06F 21/60 | (2013.01) |
| G06F 21/10 | (2013.01) |

(52) U.S. Cl.
CPC ............ *G06F 21/78* (2013.01); *G06F 3/0622* (2013.01); *G06F 3/0623* (2013.01); *G06F 3/0652* (2013.01); *G06F 3/0659* (2013.01); *G06F 3/0673* (2013.01); *G06F 21/602* (2013.01); *G06F 21/107* (2023.08)

(58) Field of Classification Search
None
See application file for complete search history.

(56) References Cited

U.S. PATENT DOCUMENTS 11,243,710 B1 *   2/2022   Picone ..................... G06F 3/062

FOREIGN PATENT DOCUMENTS

CN           218977000 U  *  5/2023

* cited by examiner

*Primary Examiner* — Midys Rojas
(74) *Attorney, Agent, or Firm* — Bayramoglu Law Offices LLC

(57) ABSTRACT

A storage device for data encryption and self-destruction includes a controller, an interface module, a storage module, an encryption and authentication module, a positioning module, a power supply module, and a communication and self-destruction module. The interface module, the storage module, the encryption and authentication module, the positioning module and the communication and self-destruction module are electrically connected to the controller, respectively. The encryption and authentication module is configured to encrypt and protect data stored in the storage module, and authenticate a request for remote access to the storage device. The communication and self-destruction module is configured to send position information acquired by the positioning module to a storage device management system, receive and execute a data destruction instruction issued by the storage device management system, and destruct the data stored in the storage module. The power supply module is configured to provide electrical energy for the storage device.

9 Claims, 1 Drawing Sheet

STORAGE DEVICE FOR DATA ENCRYPTION AND SELF-DESTRUCTION

CROSS REFERENCE TO THE RELATED APPLICATIONS

This application is based upon and claims priority to Chinese Patent Applications No. 202011064302.7, filed on Sep. 30, 2020, the entire contents of which are incorporated herein by reference.

TECHNICAL FIELD

The present invention relates to the technical field of data storage, and more particularly, to a storage device for data encryption and self-destruction.

BACKGROUND

Data storage devices such as traditional universal serial bus (USB) flash disks and mobile hard disks only provide simple information access services. Electronic files are copied to a storage device and copied out when needed. It can be seen that the data storage devices commonly used on the market can only function to provide simple information access. If a data storage device is lost, the files in the data storage device may be illegally accessed by others. Currently, the encrypted data storage devices mainly use data encryption standard (DES), advanced encryption standard (AES), or some encryption algorithms without security verification. These encryption algorithms are not independently developed and are prone to loopholes that may be exploited by hackers and spies. For government departments, enterprises and institutions, when important data information is lost, the data in the data storage device must be destructed remotely so as to ensure that the relevant sensitive and confidential information is not leaked.

SUMMARY

In order to overcome or at least partially solve the above problems in the prior art, an objective of the present invention is to provide a storage device for data encryption and self-destruction.

A storage device for data encryption and self-destruction includes a controller, an interface module, a storage module, an encryption and authentication module, a positioning module, a power supply module, and a communication and self-destruction module, where the interface module, the storage module, the encryption and authentication module, the positioning module and the communication and self-destruction module are electrically connected to the controller, respectively; the encryption and authentication module is configured to encrypt and protect data stored in the storage module, and authenticate a request for remote access to the storage device; the communication and self-destruction module is configured to send position information acquired by the positioning module to a storage device management system, receive and execute a data destruction instruction issued by the storage device management system, and destruct the data stored in the storage module; and the power supply module is configured to provide electrical energy for the storage device for running.

Further, the encryption and authentication module may include:

an initialization sub-module, configured to acquire security authentication information when the storage device is connected to a computer device for a first time, where the security authentication information includes personal information, location information and device information;

an encryption sub-module, configured to encrypt and protect the data written into the storage module;

a first authentication sub-module, configured to authenticate the request for remote access to the storage device; and a second authentication sub-module, configured to authenticate a request for local access to the data in the storage module.

Further, the encryption and authentication module may further include a smart contract sub-module configured to execute a smart contract; the smart contract may be configured to preprocess and write the security authentication information acquired by the initialization sub-module into a block, and upload the block to a block chain; and the smart contract may be further configured to parse the block chain to acquire the security authentication information corresponding to the storage device and send the security authentication information to the first authentication sub-module or the second authentication sub-module.

Further, the storage device may include a housing; a chamber may be formed in the housing; the chamber may be configured to accommodate a printed circuit board (PCB) integrated with the controller, the interface module, the storage module, the positioning module, the power supply module and the communication and self-destruction module; and the storage module may include an electronic storage chip array composed of a plurality of electronic storage chips.

Further, a data destruction mechanism may be provided in the chamber; the data destruction mechanism may include a plurality of hollow tubes that may be fixedly connected to an inner side wall of the chamber; one end surface of a hollow tube may be provided with an opening and faces an electronic storage chip, and the other end surface of the hollow tube may be axially provided with a straight tube; a protrusion may be axially provided at an end of the straight tube facing the opening of the hollow tube; a slidable plunger may be provided between the straight tube and the opening of the hollow tube; a through hole may penetrate the plunger and is axially provided in the plunger, and the protrusion may be inserted into the through hole; the hollow tube holds corrosive liquid; and the data destruction mechanism may further include an execution mechanism configured to move the plunger according to an instruction of the communication and self-destruction module.

Further, the execution mechanism may include a thermoplastic filler, a heating wire and a relay; the thermoplastic filler may be filled between the plunger and the end surface of the hollow tube with the opening; a heating end of the heating wire extends into the thermoplastic filler; the heating wire, the relay and the power supply module may be electrically connected in sequence; and the relay may be signal-connected to the communication and self-destruction module.

Further, the storage device may further include a partition setting module; the partition setting module may be configured to set a restriction condition for data stored in different electronic storage chips, where the restriction condition may include a data type and a data confidentiality level; and the partition setting module may be further configured to write data into a corresponding electronic storage chip according to the restriction condition when the data is written into the storage module.

Further, the storage device may further include a cloud storage module; and the cloud storage module may be configured to transfer the data in the storage module to a cloud server for storage, or download data stored in the cloud server to the local; and the cloud storage module may be further configured to provide an index of the data stored in the storage module and the data stored in the cloud server.

Further, the cloud server may further include an encryption sub-module; the encryption sub-module may be configured to acquire the security authentication information and to-be-stored data information, respectively perform a hash operation on the security authentication information and the data information through a function to obtain a first operation result and a second operation result, use the first operation result and the second operation result as parameters to respectively generate a public key and a private key through a key generation function, encrypt the to-be-stored data with the private key, and send the public key to the cloud storage module; and the cloud storage module may be further configured to store the public key in a designated electronic storage chip.

Further, the cloud server may further include an authentication sub-module; the authentication sub-module may be configured to perform an authentication on an identity of the storage device or the storage device management system; the authentication may include: verifying authentication information carried in an authentication request through the public key when the cloud server receives the authentication request initiated by the storage device or the storage device management system; and the authentication information may be signed by the private key generated by the storage device or the storage device management system.

Compared with the prior art, the present invention has the following advantages:

In the present invention, by encrypting and protecting the data stored in the storage module through the encryption and authentication module, when the storage device is lost, an illegal user cannot acquire the stored data in a short time. Meanwhile, the positioning module will position the storage device, which will help the user to retrieve the storage device. In addition, the communication and self-destruction module is introduced. When the storage device is lost, if it is hard to retrieve and the stored data has high confidentiality and importance, the communication and self-destruction module can be remotely controlled to execute a data destruction instruction to destruct the data so as to prevent data leakage, which effectively protects the security of the user' private information.

BRIEF DESCRIPTION OF THE DRAWINGS

In order to describe the technical solutions in the embodiments of the present invention more clearly, the drawings required to describe the embodiments are briefly described below. Apparently, the drawings described below are only preferred embodiments of the present invention. Those of ordinary skill in the art may further obtain other drawings based on these drawings without creative efforts.

Figure 1:
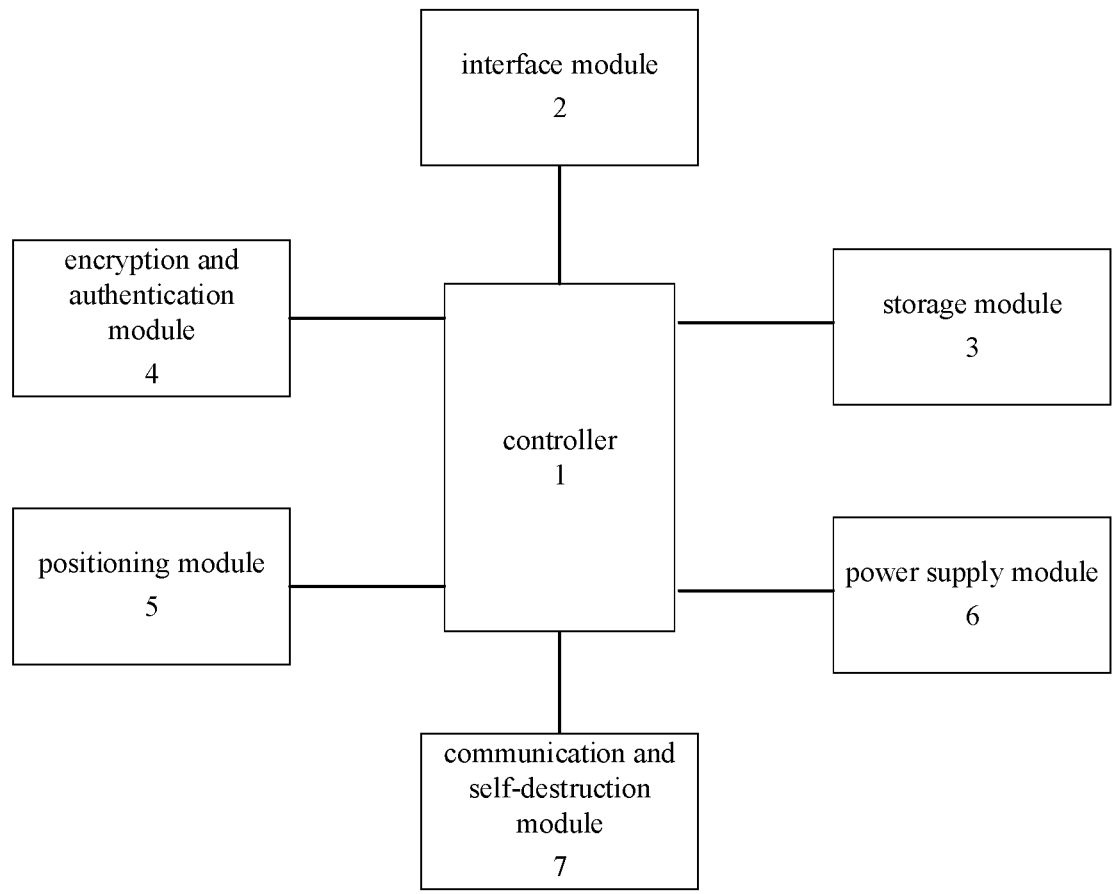
FIG. 1 is a view illustrating an overall structure of a storage device for data encryption and self-destruction according to an embodiment of the present invention.

Reference Numerals: 1. controller; 2. interface module; 3. storage module; 31. electronic storage chip; 4. encryption and authentication module; 5. positioning module; 6. power supply module; 7. communication and self-destruction module; 8. housing; 9. chamber; 101. hollow tube; 102. straight tube; 1021. protrusion; 103. plunger; 104 through hole; 105. thermoplastic filler; and 106. heating wire.

DETAILED DESCRIPTION OF THE EMBODIMENTS

The principles and features of the present invention are described below with reference to the drawings. The listed embodiments only serve to explain the present invention, rather than to limit the scope of the present invention.

Referring to FIG. 1, the present invention provides a storage device for data encryption and self-destruction. The storage device includes a controller 1, an interface module 2, a storage module 3, an encryption and authentication module 4, a positioning module 5, a power supply module 6, and a communication and self-destruction module 7. The interface module, the storage module 2, the storage module 3, the encryption and authentication module 4, a positioning module 5 and the communication and self-destruction module 7 are electrically connected to the controller, respectively. The power supply module 6 is configured to provide electrical energy for the storage device for running.

Specifically, the controller 1 is a data processing core of the storage device, which may be a single-chip microcomputer, a field-programmable gate array (FPGA) or a microprocessor, etc. The interface module 2 is an interface for data communication between the storage device and a computer or other device, which may be a universal serial bus (USB) interface or other interface. The interface module 2 may also charge the power supply module 6. When the power of the power supply module 6 is exhausted, the interface module 2 is able to provide the power required for operation of the storage device. The storage module 3 is configured to store data copied from the computer or other device. The encryption and authentication module 4 runs on the controller 1, and is configured to encrypt and protect data stored in the storage module and authenticate a request for remote access to the storage device. The positioning module 5 is configured to determine a current position of the storage device by receiving a signal from a positioning satellite. The communication and self-destruction module 7 is configured to send position information acquired by the positioning module to a storage device management system, receive and execute a data destruction instruction issued by the storage device management system, and destruct the data stored in the storage module.

In some implementations, the communication and self-destruction module 7 may communicate with the storage device management system through one or more of narrowband Internet of things (NB-IoT), second-generation cellular network (2G), wireless fidelity (WIFI) and fourth generation of broadband cellular network technology (4G). The power supply module 6 may be a disposable battery, a rechargeable battery or a solar battery. The positioning module 5 may be a Beidou positioning module or a global positioning system (GPS) positioning module.

When data is written to the storage device through a computer or other device, the controller 1 calls the encryption and authentication module 4 to authenticate an access request of the computer. When the authentication is passed, the controller allows the computer to write the data into the storage module 3, and the encryption and authentication module 4 encrypts a written data stream. In some implementations, the authentication may be implemented through an SM2 authentication algorithm, and may also be implemented through other authentication algorithm. The encryption may be implemented through an SM4 encryption algorithm, or may be implemented through other encryption algorithm. The data stored in the storage device is encrypted, so even if the storage device is lost, the data is guaranteed to be secure in a short time.

When data is read from the storage device through a computer or other device, the computer or other device initiates a data read request to the controller 1. The controller 1 calls the encryption and authentication module 4 to authenticate the local access request. When the authentication is passed, the controller 1 allows the computer or other device to read the data in the storage module 3, and the encryption and authentication module decrypts the output data stream.

Specifically, the encryption and authentication module 4 includes:

an initialization sub-module, configured to acquire security authentication information when the storage device is connected to a computer device for a first time, where the security authentication information includes personal information, location information and device information; an encryption sub-module, configured to encrypt and protect the data written into the storage module; a first authentication sub-module, configured to authenticate the request for remote access to the storage device; and a second authentication sub-module, configured to authenticate a request for local access to the data in the storage module.

The personal information refers to information of a user corresponding to the storage device. The location information refers to a geographic area set by the user corresponding to the storage device. The device information refers to a connectable device set by the user corresponding to the storage device. When the user uses the storage device for a first time, the storage device needs to be connected to the computer or other device to set the security authentication information through a human-computer interaction interface provided by the initialization sub-module.

If the storage device is lost, the user can log in to the storage device management system through the computer or other device to view the current real-time location of the storage device. An instruction may be sent to the storage device through the storage management system to find the current real-time location of the storage device. Before the storage device feeds back the real-time location information to the storage device management system, the first authentication sub-module authenticates a request of the storage management system to access the storage device. The authentication may be to require security authentication information, or may be to verify a network address of the requester initiating the remote access. After the storage device management system acquires the real-time location information of the storage device, it can help the user find the storage device as soon as possible. Since the storage device has its own power supply module, it can send position information to the outside even if it is not connected to the computer or other device.

As an example, the encryption and authentication module 4 further includes a smart contract sub-module configured to execute various smart contracts. One smart contract is configured to preprocess and write the security authentication information acquired by the initialization sub-module into a block, and upload the block to a block chain. The preprocessing may be converting the security authentication information into a standard format, and performing encryption processing on the security authentication information. By writing the security authentication information into the block chain, the feature that block chain data cannot be tampered with is fully utilized, which ensures that the security authentication information is not illegally stolen and tampered with. The other smart contract is configured to parse the block chain to acquire the security authentication information corresponding to the storage device and send the security authentication information to the first authentication sub-module or the second authentication sub-module. When the encryption and authentication module 4 needs to authenticate a request for remote access to the storage device or authenticate a request for local access to the storage module data, the smart contract is executed to parse the block chain to acquire the security authentication information and authenticate the request based on the security authentication information. In some implementations, only the smart contract sub-module of the storage device that uploads the block can parse the corresponding block, so as to prevent an illegal user from acquiring the security authentication information.

When the data stored in the storage device is very confidential, the loss of the storage device may bring very serious consequences to the user. In this case, the user can remotely send a data destruction instruction to the storage device through the storage device management system. When the storage device receives the data destruction instruction, the first authentication sub-module authenticates the request. After the authentication is passed, the communication and self-destruction module erases the data in the storage module in real time, so as to ensure that the data in the USB flash disk is not decrypted and utilized by an illegal person such as a hacker.

In another embodiment of the present invention, the storage device includes a housing 8. A chamber 9 is formed in the housing 8. The chamber 9 is configured to accommodate a printed circuit board (PCB) integrated with the controller 1, the interface module 2, the storage module 3, the positioning module 5, the power supply module 6 and the communication and self-destruction module 7. The storage module 3 includes an electronic storage chip array composed of a plurality of electronic storage chips 31.

Figure 2:
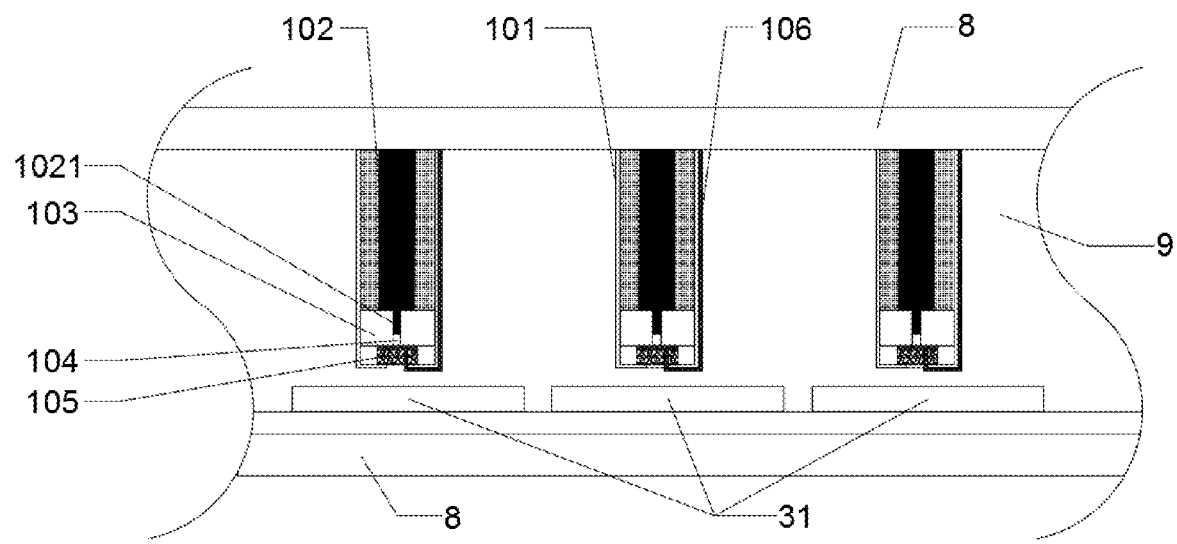
FIG. 2 is a view illustrating a structure of a data destruction mechanism according to an embodiment of the present invention.

As shown in FIG. 2, a data destruction mechanism is provided in the chamber 9. The data destruction mechanism includes a plurality of hollow tubes 101 fixedly connected to an inner side wall of the chamber. One end surface of a hollow tube 101 is provided with an opening and faces an electronic storage chip 31, and the other end surface of the hollow tube 101 is axially provided with a straight tube 102. A protrusion 1021 is axially provided at an end of the straight tube 102 facing the opening of the hollow tube. A slidable plunger 103 is provided between the straight tube 102 and the opening of the hollow tube 101. A through hole 104 penetrates the plunger 103 and is axially provided in the plunger 103. The protrusion 1021 is inserted into the through hole 104. The hollow tubes 101 hold a corrosive liquid. The data destruction mechanism further includes an execution mechanism configured to move the plunger 103 according to an instruction of the communication and self-destruction module.

Specifically, the execution mechanism includes a thermoplastic filler 105, a heating wire 106 and a relay. The thermoplastic filler 105 is filled between the plunger 103 and the end surface of the hollow tube 101 with the opening. A heating end of the heating wire 106 extends into the thermoplastic filler 105. The heating wire 106, the relay and the power supply module are electrically connected in sequence. The relay is signal-connected to the communication and self-destruction module 7.

The relay is normally disconnected. The top of the plunger 103 is in contact with an end surface of the straight tube 102 with the protrusion 1021, and the protrusion 1021 is inserted into the through hole 104 to block the through hole 104. The corrosive liquid is stored in an interlayer between the hollow tube 101 and the straight tube 102. After the communication and self-destruction module issues a data destruction instruction, the relay is connected. The power supply module provides electrical energy for the heating wire 106, and the heating end of the heating wire 106 generates heat, which causes the thermoplastic filler 105 to deform and flow out from the opening of the hollow tube 101. Without the support of the thermoplastic filler 105, the plunger 103 falls off, and the protrusion 1021 slides out of the through hole 104. The corrosive liquid flows through the through hole 104 and falls from the opening of the hollow tube 101 to the electronic storage chip 31 to corrode and damage the electronic storage chip 31. In this way, the data is physically destructed so as to prevent others from stealing the erased data in the storage module 3 through data recovery, which improves data security and confidentiality. In some implementations, the user sets the encryption and authentication module and the communication and self-destruction module in advance, such that if the encryption and authentication module fails a plurality of authentications when a data access request is initiated to the storage module locally, the communication and self-destruction module automatically issues a data destruction instruction.

As a preferred example, the storage device further includes a cloud storage module; and the cloud storage module is configured to transfer the data in the storage module to a cloud server for storage, or download data stored in the cloud server to the local; and the cloud storage module is further configured to provide an index of the data stored in the storage module and the data stored in the cloud server.

When a storage space in the storage module 3 is about to run out, the cloud storage module may upload the written data to the cloud server for storage. The user can read the corresponding data through the computer device according to the index of the data stored in the storage module or the cloud server provided by the cloud storage module. The cloud storage module determines whether the data storage location is in the storage module or the cloud server according to the data that the user needs to read, acquires the data from the corresponding location and transmits the data to the computer device. From the user's perspective, there is no difference between the data acquired from the cloud server and the data read from the storage module. Therefore, the storage device provides the user with a greater storage space and a better experience.

The cloud server further includes an encryption sub-module. The encryption sub-module is configured to acquire the security authentication information and to-be-stored data information, respectively perform a hash operation on the security authentication information and the data information through a function to obtain a first operation result and a second operation result, use the first operation result and the second operation result as parameters to respectively generate a public key and a private key through a key generation function, encrypt the to-be-stored data with the private key, and send the public key to the cloud storage module. The cloud storage module is further configured to store the public key in a designated electronic storage chip. When the cloud server receives a remote request to acquire the stored data, the cloud server first verifies the security authentication information of the requester, and then sends the encrypted stored data to the requester. After the requester receives the encrypted stored data, the requester can only decrypt the data with the public key, which ensures the security of the data. The public key and the private key are generated based on the hashed security authentication information and data information. Since the calculation method, security authentication information, and data information are all unknown, the difficulty of decrypting is greatly increased, and the security of the data is further guaranteed.

The cloud server further includes an authentication sub-module. The authentication sub-module is configured to perform an authentication on an identity of the storage device or the storage device management system. When the storage device or the storage device management system initiates an authentication request to the cloud server, the storage device or the storage device management system first signs its own authentication information with the generated private key, and then sends the signed authentication information to the cloud server. After receiving the authentication request of the storage device or the storage device management system, the cloud server uses the public key of the storage device or the storage device management system to verify its identity. The cloud storage module stores the public key of the storage device or the storage device management system.

As an example, the storage device further includes a partition setting module. The partition setting module is configured to set a restriction condition for data stored in different electronic storage chips. The restriction condition includes a data type and a data confidentiality level. The partition setting module is further configured to write data into a corresponding electronic storage chip according to the restriction condition when the data is written into the storage module. Specifically, the user may set the data type in a certain electronic storage chip to be the public key and the data entity through the partition setting module, or set the data type to be only the public key or the data entity. In this way, all data is stored in the cloud server, and the storage device only stores the public key configured to decrypt the data, thereby greatly increasing the amount of to-be-stored data. By setting different data security levels, the storage device can set the access rights of the data in different electronic storage chips and whether security authentication is required. The communication and self-destruction module can control the data destruction mechanism to destruct a corresponding electronic storage chip according to the data confidentiality level.

The above described are merely preferred embodiments of the present invention, which are not intended to limit the present invention. Any modifications, equivalent replacements and improvements made within the spirit and principle of the present invention should be included in the protection scope of the present invention.

What is claimed is:

1. A storage device for data encryption and self-destruction, comprising a controller, an interface module, a storage module, an encryption and authentication module, a positioning module, a power supply module, and a communication and self-destruction module, wherein
the interface module, the storage module, the encryption and authentication module, the positioning module and the communication and self-destruction module are electrically connected to the controller, respectively;
the encryption and authentication module comprises: an initialization sub-module, configured to acquire security authentication information when the storage device is connected to a computer device for a first time, wherein the security authentication information comprises personal information, location information and device information;

an encryption sub-module, configured to encrypt and protect the data written into the storage module;

a first authentication sub-module, configured to authenticate the request for remote access to the storage device; and a second authentication sub-module, configured to authenticate a request for local access to the data in the storage module, wherein the encryption and authentication module is configured to encrypt and protect data stored in the storage module, and authenticate a request for remote access to the storage device;

the communication and self-destruction module is configured to send current position information of the storage device acquired by the positioning module to a storage device management system, receive and execute a data destruction instruction issued by the storage device management system, and destruct the data stored in the storage module; and the power supply module is configured to provide electrical energy for the storage device for running.

2. The storage device according to claim 1, further comprising a housing, wherein a chamber is formed in the housing;

the chamber is configured to accommodate a printed circuit board (PCB) integrated with the controller, the interface module, the storage module, the positioning module, the power supply module and the communication and self-destruction module; and the storage module comprises an electronic storage chip array comprising a plurality of electronic storage chips.

3. The storage device according to claim 2, wherein a data destruction mechanism is provided in the chamber;

the data destruction mechanism comprises a hollow tube fixedly connected to an inner side wall of the chamber;

a first end surface of the hollow tube is provided with an opening and faces an electronic storage chip of the plurality of electronic storage chips, and a second end surface of the hollow tube is axially provided with a straight tube;

a protrusion is axially provided at an end of the straight tube, wherein the end of the straight tube faces the opening of the hollow tube;

a slidable plunger is provided between the straight tube and the opening of the hollow tube;

a through hole penetrates the slidable plunger and is axially provided in the slidable plunger, and the protrusion is inserted into the through hole;

the hollow tube holds a corrosive liquid; and the data destruction mechanism further comprises an execution mechanism, wherein the execution mechanism is configured to move the slidable plunger according to an instruction of the communication and self-destruction module.

4. The storage device according to claim 3, wherein the execution mechanism comprises a thermoplastic filler, a heating wire and a relay;

the thermoplastic filler is filled between the slidable plunger and the first end surface of the hollow tube;

a heating end of the heating wire extends into the thermoplastic filler;

the heating wire, the relay and the power supply module are electrically connected in sequence; and the relay is signal-connected to the communication and self-destruction module.

5. The storage device according to claim 2, further comprising a partition setting module, wherein the partition setting module is configured to set a restriction condition for data stored in different electronic storage chips, wherein the restriction condition comprises a data type and a data confidentiality level; and the partition setting module is further configured to write data into a corresponding electronic storage chip according to the restriction condition when the data is written into the storage module.

6. The storage device according to claim 2, further comprising a cloud storage module, wherein the cloud storage module is configured to transfer the data in the storage module to a cloud server for storage, or download data stored in the cloud server to local storage; and the cloud storage module is further configured to provide an index of the data stored in the storage module and the data stored in the cloud server.

7. The storage device according to claim 6, wherein the cloud server further comprises an encryption sub-module;

the encryption sub-module is configured to acquire the security authentication information and to-be-stored data information, respectively perform a hash operation on the security authentication information and the to-be-stored data information through a function to obtain a first operation result and a second operation result, use the first operation result and the second operation result as parameters to respectively generate a public key and a private key through a key generation function, encrypt the to-be-stored data information with the private key, and send the public key to the cloud storage module; and the cloud storage module is further configured to store the public key in a designated electronic storage chip.

8. The storage device according to claim 7, wherein the cloud server further comprises an authentication sub-module;

the authentication sub-module is configured to perform an authentication on an identity of the storage device or the storage device management system;

the authentication comprises: verifying authentication information carried in an authentication request through the public key when the cloud server receives the authentication request initiated by the storage device or the storage device management system; and the authentication information is signed by the private key generated by the storage device or the storage device management system.

9. The storage device according to claim 6, wherein the cloud server further comprises an authentication sub-module;

the authentication sub-module is configured to perform an authentication on an identity of the storage device or the storage device management system;

the authentication comprises: verifying authentication information carried in an authentication request through the public key when the cloud server receives the authentication request initiated by the storage device or the storage device management system; and the authentication information is signed by the private key generated by the storage device or the storage device management system.

* * * * *